(12) United States Patent
Matsumura et al.

(10) Patent No.: US 12,219,369 B2
(45) Date of Patent: Feb. 4, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 339 days.

(21) Appl. No.: 17/638,582

(22) PCT Filed: Aug. 13, 2020

(86) PCT No.: PCT/JP2020/030792
§ 371 (c)(1),
(2) Date: Feb. 25, 2022

(87) PCT Pub. No.: WO2021/039423
PCT Pub. Date: Mar. 4, 2021

(65) Prior Publication Data
US 2022/0295304 A1    Sep. 15, 2022

(30) Foreign Application Priority Data

Aug. 30, 2019  (JP) .................... 2019-158303

(51) Int. Cl.
| | |
|---|---|
| *H04W 16/28* | (2009.01) |
| *H04W 72/0446* | (2023.01) |
| *H04W 72/0453* | (2023.01) |
| *H04W 72/1273* | (2023.01) |
| *H04W 72/23* | (2023.01) |

(52) U.S. Cl.
CPC ....... *H04W 16/28* (2013.01); *H04W 72/0446* (2013.01); *H04W 72/0453* (2013.01); *H04W 72/1273* (2013.01); *H04W 72/23* (2023.01)

(58) Field of Classification Search
CPC ............. H04W 16/28; H04W 72/0446; H04W 72/0453; H04W 72/1273; H04W 72/23; H04W 72/1268; H04L 5/0048; H04L 5/0053; H04L 5/0023; H04B 7/0628
See application file for complete search history.

(56) References Cited

U.S. PATENT DOCUMENTS

2021/0391899 A1* 12/2021 Cao ...................... H04B 17/373
2022/0295304 A1*  9/2022 Matsumura ....... H04W 72/1273
(Continued)

OTHER PUBLICATIONS

Office Action issued in the counterpart Japanese Patent Application No. 2021-542734, mailed on Jul. 11, 2023 (8 pages).
(Continued)

*Primary Examiner* — Julio R Perez
(74) *Attorney, Agent, or Firm* — Osha Bergman Watanabe & Burton LLP

(57) ABSTRACT

A terminal includes a control section that determines, when a spatial relation for specific UL transmission is not configured, one specific spatial relation between a quasi-co-location (QCL) parameter related to a latest slot for a start symbol for the specific UL transmission or a first or last symbol for DL transmission corresponding to the specific UL transmission and a transmission configuration indication (TCI) state or a reference signal for path loss reference in a case where only one transmission configuration indication (TCI) state is activated for the specific DL transmission, and a transmitting section that performs the specific UL transmission in accordance with the specific spatial relation.

6 Claims, 6 Drawing Sheets

(56) References Cited

U.S. PATENT DOCUMENTS

2023/0140502 A1* 5/2023 Guan .................. H04B 7/0695
   375/262
2023/0262678 A1* 8/2023 Fan ..................... H04B 7/0695
   370/329

OTHER PUBLICATIONS

Qualcomm Incorporated; "Enhancements on Multi-beam Operation"; 3GPP TSG-RAN WG1 Meeting #98, R1-1909273; Prague, Czech; Aug. 26-30, 2019 (19 pages).
RAN1; "Maintenance of NR—38.214"; 3GPP TSG-RAN Meeting #84, RP-191284; Newport Beach, California, United States; Jun. 3-6, 2019 (2 pages).
Nokia; "Corrections to 38.214 including alignment of terminology across specifications"; 3GPP TSG RAN WG1 #97, R1-1907964; Reno, Nevada, U.S.A; May 13-17, 2019 (42 pages).
International Search Report issued in PCT/JP2020/030792 on Nov. 2, 2020 (1 page).
Written Opinion of the International Searching Authority issued in PCT/JP2020/030792 on Nov. 2, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

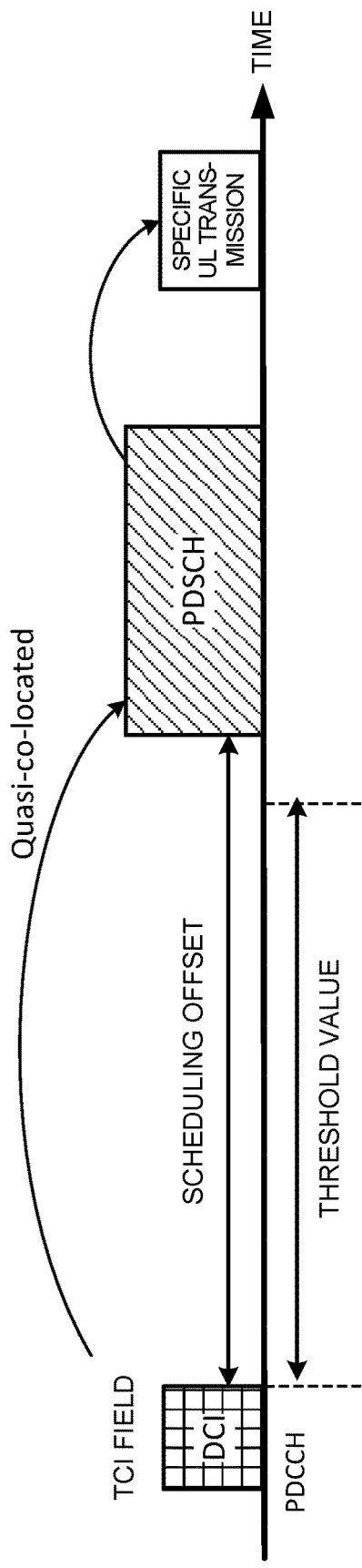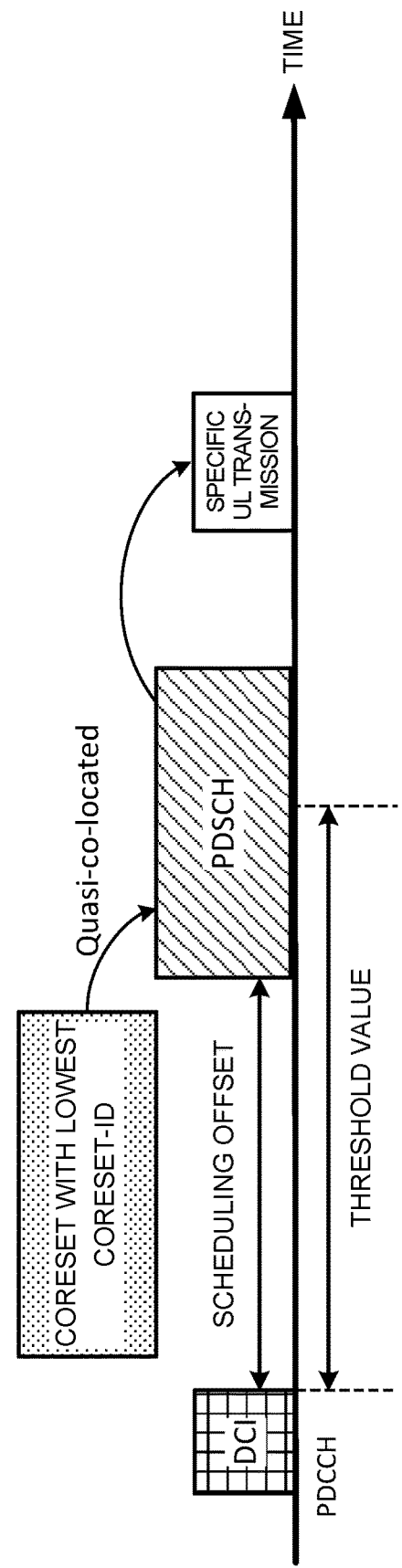

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (e.g., NR), with respect to beams (spatial relations) for uplink (UL) transmission, such as a PUCCH, a PUSCH, and an SRS, specifying one of a plurality of candidates configured by higher layer signaling by using a media access control (Medium Access Control (MAC)) control element (CE), downlink control information (DCI), or the like is under study.

However, the number of configurable candidates is limited. Due to use of many candidates, when reconfiguration is performed by the higher layer signaling, latency, resource consumption, or the like may occur.

Thus, an object of the present disclosure is to provide a terminal and a radio communication method that can appropriately perform UL transmission control.

Solution to Problem

A terminal according to one aspect of the present disclosure includes a control section that determines, when a spatial relation for specific UL transmission is not configured, one specific spatial relation between a quasi-co-location (QCL) parameter related to a latest slot for a start symbol for the specific UL transmission or a first or last symbol for DL transmission corresponding to the specific UL transmission and a transmission configuration indication (TCI) state or a reference signal for path loss reference in a case where only one transmission configuration indication (TCI) state is activated for the specific DL transmission, and a transmitting section that performs the specific UL transmission in accordance with the specific spatial relation.

Advantageous Effects of Invention

According to one aspect of the present disclosure, it is possible to appropriately perform UL transmission control.

BRIEF DESCRIPTION OF DRAWINGS

FIGS. 2A and 2B are diagrams to show an example of a QCL assumption for a PDSCH;

Figure 1:
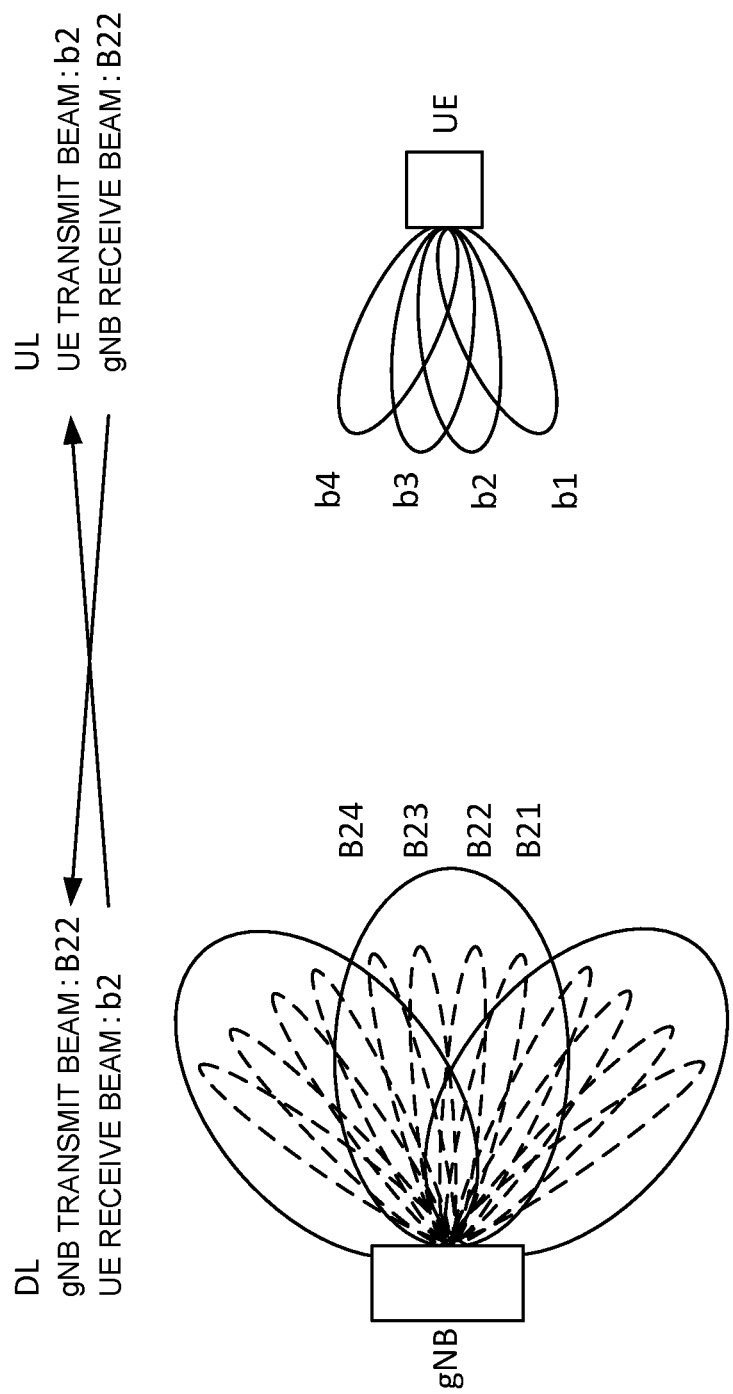
FIG. 1 is a diagram to show an example of beam correspondence.

DESCRIPTION OF EMBODIMENTS (TCI, Spatial Relation, QCL)

For NR, controlling reception processing (e.g., at least one of reception, demapping, demodulation, and decoding), transmission processing (e.g., at least one of transmission, mapping, precoding, modulation, and coding), and the like of at least one of a signal and a channel (which may be expressed as a signal/channel; in the present disclosure, "A/B" may be similarly interpreted as "at least one of A and B") in a UE on the basis of a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information (SRI), or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A: Doppler shift, Doppler spread, average delay, and delay spread
QCL type B: Doppler shift and Doppler spread
QCL type C: Doppler shift and Average delay
QCL type D: Spatial reception parameter Types A to C may correspond to QCL information related to synchronization processing of at least one of time and frequency, and type D may correspond to QCL information related to beam control.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling or physical layer signaling, or a combination of these.

In the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit y(PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

Note that the channel/signal being a target for application of the TCI state may be referred to as a target channel/RS, or may be simply referred to as a target and so on, and the above-described another signal may be referred to as a reference RS, or may be simply referred to as a reference and so on.

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), and a reference signal for measurement (Sounding Reference Signal (SRS)). Alternatively, the DL-RS may be a CSI-RS used for tracking (also referred to as a Tracking Reference Signal (TRS)), or a reference signal used for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the DL-RS to have a QCL relationship (DL-RS relation information) and information indicating a QCL type (QCL type information). The DL-RS relation information may include information such as an index of the DL-RS (for example, an SSB index, or a non-zero power CSI-RS (NZP CSI-RS) resource ID (Identifier)), an index of a cell in which the RS is located, and an index of a Bandwidth Part (BWP) in which the RS is located.

<TCI State for PDCCH>

Information related to QCL between the PDCCH (or a DMRS antenna port related to the PDCCH) and a certain DL-RS may be referred to as a TCI state for the PDCCH and so on.

The UE may judge a TCI state for a UE-specific PDCCH (CORESET) on the basis of higher layer signaling. For example, one or a plurality (K pieces) of TCI states may be configured for the UE by RRC signaling (ControlResourceSet information element) for each CORESET.

One or a plurality of TCI states may be activated with respect to each CORESET with use of a MAC CE. The MAC CE may be referred to as a TCI state indication MAC CE for a UE-specific PDCCH (TCI State Indication for UE-specific PDCCH MAC CE). The UE may perform CORESET monitoring on the basis of an active TCI state corresponding to the CORESET.

<TCI State for PDSCH>

Information related to QCL between a PDSCH (or a DMRS antenna port related to the PDSCH) and a certain DL-RS may be referred to as a TCI state for the PDSCH and so on.

M (M≥1) pieces of TCI states for the PDSCH (M pieces of QCL information for the PDSCH) may be notified to (configured for) the UE by higher layer signaling. Note that the number of the TCI states M configured for the UE may be limited by at least one of a UE capability and a QCL type.

DCI used for scheduling of the PDSCH may include a certain field (which may be referred to as, for example, a TCI field, a TCI state field, and so on) indicating a TCI state for the PDSCH. The DCI may be used for scheduling of a PDSCH in one cell, and may be referred to as, for example, DL DCI, DL assignment, DCI format 1_0, DCI format 1_1, and so on.

Whether the TCI field is included in the DCI may be controlled by information notified from a base station to the UE. The information may be information (e.g., TCI presence information, TCI presence information in DCI, or a higher layer parameter TCI-PresentInDCI) indicating whether the TCI field is present or absent in the DCI. For example, the information may be configured for the UE by higher layer signaling.

When more than eight kinds of TCI states are configured for the UE, eight or less kinds of TCI states may be activated (or specified) with use of a MAC CE. The MAC CE may be referred to as a MAC CE for TCI state activation/deactivation for a UE-specific PDSCH (TCI States Activation/Deactivation for UE-specific PDSCH MAC CE). A value of the TCI field in the DCI may indicate one of the TCI states activated by the MAC CE.

When the TCI presence information set to "enabled" for a CORESET to schedule the PDSCH (CORESET used for PDCCH transmission to schedule the PDSCH) is configured for the UE, the UE may assume that the TCI field exists in DCI format 1_1 for a PDCCH transmitted on the CORESET.

In a case where the TCI presence information is not configured for a CORESET to schedule a PDSCH or the PDSCH is scheduled by DCI format 1_0, when time offset between reception of DL DCI (DCI to schedule the PDSCH) and reception of a PDSCH corresponding to the DCI is equal to or greater than a threshold value, the UE may assume that a TCI state or QCL assumption for the PDSCH is, for determination of QCL of a PDSCH antenna port, identical to a TCI state or QCL assumption applied to a CORESET used for PDCCH transmission to schedule the PDSCH.

When the TCI presence information is set to "enabled," when a TCI field in DCI in a component carrier (CC) to schedule (a PDSCH) indicates an activated TCI state in a CC or DL BWP to be scheduled and the PDSCH is scheduled by DCI format 1_1, the UE may use, for determination of QCL of the PDSCH antenna port, a TCI according to a TCI field value in a detected PDCCH including the DCI. When time offset between reception of DL DCI (to schedule the PDSCH) and a PDSCH corresponding to the DCI (PDSCH scheduled by the DCI) is equal to or greater than a threshold value, the UE may assume that a DM-RS port for a PDSCH of a serving cell is QCL with an RS in a TCI state related to a QCL type parameter given by an indicated TCI state.

When a single-slot PDSCH is configured for the UE, the indicated TCI state may be based on an activated TCI state in a slot with the scheduled PDSCH. When a multi-slot PDSCH is configured for the UE, the indicated TCI state may be based on an activated TCI state in the first slot with the scheduled PDSCH, and the UE may expect that the indicated TCI state is identical through slots with the scheduled PDSCH. When a CORESET associated with a search space set for cross-carrier scheduling is configured for the UE, TCI presence information is set to "enabled" for the CORESET for the UE, and when at least one of TCI states configured for a serving cell scheduled by the search space set includes QCL type D, the UE may assume that time offset between a detected PDCCH and a PDSCH corresponding to the PDCCH is equal to or greater than a threshold value.

In both a case where TCI information in DCI (higher layer parameter TCI-PresentInDCI) is set to "enabled" in an RRC connected mode and a case where the TCI information in the DCI is not configured in the RRC connected mode, when time offset between reception of DL DCI (DCI to schedule a PDSCH) and a corresponding PDSCH (PDSCH scheduled by the DCI) is less than a certain threshold value, the UE may assume that the DM-RS port for the PDSCH in the serving cell includes the lowest (minimum) CORESET-ID in the latest (most recent) slot in which one or more CORESETs in an active BWP for the serving cell are monitored by the UE, and may assume that the DM-RS port is QCL with an RS related to a QCL parameter used for QCL indication of a PDCCH of a CORESET associated with a monitored search space.

The time offset between reception of DL DCI and reception of a PDSCH corresponding to the DCI may be referred to as scheduling offset.

The above-described threshold value may be referred to as a time length for QCL, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, and so on.

The scheduling offset threshold value may be based on a UE capability, and may be based on, for example, a delay in decoding of a PDCCH and beam switching. Information about the scheduling offset threshold value may be configured with use of higher layer signaling from the base station, or may be transmitted from the UE to the base station.

For example, the UE may assume that a DMRS port for the above-described PDSCH is QCL with a DL-RS based on a TCI state activated with respect to a CORESET corresponding to the above-described lowest CORESET-ID. The latest slot may be, for example, a slot for receiving DCI to schedule the above-described PDSCH.

Note that the CORESET-ID may be an ID (ID for CORESET identification) configured by an RRC information element "ControlResourceSet."

<Spatial Relation for PUCCH>

A parameter (PUCCH configuration information or PUCCH-Config) used for PUCCH transmission may be configured for the UE by higher layer signaling (e.g., Radio Resource Control (RRC) signaling). The PUCCH configuration information may be configured for a partial band (e.g., an uplink bandwidth part (BWP)) in a carrier (also referred to as a cell or a component carrier (CC)).

The PUCCH configuration information may include a list of PUCCH resource set information (e.g., PUCCH-ResourceSet) and a list of PUCCH spatial relation information (e.g., PUCCH-SpatialRelationInfo).

The PUCCH resource set information may include a list (e.g., resourceList) of PUCCH resource indices (IDs, for example, PUCCH-ResourceId).

When the UE does not have dedicated PUCCH resource configuration information (e.g., dedicated PUCCH resource configuration) provided by PUCCH resource set information in the PUCCH configuration information (before RRC setup), the UE may determine the PUCCH resource set on the basis of a parameter (e.g., pucch-ResourceCommon) in system information (e.g., System Information Block Type1 (SIB1) or Remaining Minimum System Information (RMSI)). The PUCCH resource set may include 16 pieces of PUCCH resources.

On the other hand, when the UE has the above-described dedicated PUCCH resource configuration information (UE-dedicated uplink control channel configuration or dedicated PUCCH resource configuration) (after RRC set up), the UE may determine the PUCCH resource set in accordance with the number of UCI information bits.

The UE may determine one PUCCH resource (index) in the above-described PUCCH resource set (e.g., a cell-specific or UE-dedicated PUCCH resource set to be determined) on the basis of at least one of a value of a certain field (e.g., a PUCCH resource indication (PUCCH resource indicator) field) in downlink control information (DCI) (e.g., DCI format 1_0 or 1_1 used for scheduling of a PDSCH), the number of CCEs (NccE) in a control resource set (CORESET) for PDCCH reception to deliver the DCI, and the leading (first) CCE index ($n_{CCE,0}$) for the PDCCH reception.

The PUCCH spatial relation information (e.g., an RRC information element "PUCCH-spatialRelationInfo") may indicate a plurality of candidate beams (spatial domain filters) for PUCCH transmission. The PUCCH spatial relation information may indicate a spatial association between an RS (Reference signal) and the PUCCH.

The list of the PUCCH spatial relation information may include some elements (PUCCH spatial relation information IEs (Information Elements)). Each piece of the PUCCH spatial relation information may include, for example, at least one of a PUCCH spatial relation information index (ID, for example, pucch-SpatialRelationInfoId), a serving cell index (ID, for example, servingCellId), and information related to an RS (reference RS) being in a spatial relation with the PUCCH.

For example, the information related to the RS may be an SSB index, a CSI-RS index (e.g., an NZP-CSI-RS resource configuration ID), or an SRS resource ID and BWP ID. The SSB index, the CSI-RS index, and the SRS resource ID may be associated with at least one of a beam, a resource, and a port selected depending on measurement of a corresponding RS.

When more than one SRIs related to the PUCCH are configured, the UE may control, on the basis of a PUCCH spatial relation activation/deactivation MAC CE, so that one PUCCH SRI is active for one PUCCH resource in a certain time.

A PUCCH spatial relation activation/deactivation MAC CE of Rel-15 NR is expressed by 3 octets (8 bits×3=24 bits) in total of octets (Octs) 1 to 3.

The MAC CE may include information about a serving cell ID ("Serving Cell ID" field), a BWP ID ("BWP ID" field), a PUCCH resource ID ("PUCCH Resource ID" field), or the like being a target for application.

The MAC CE includes "Si" (i=0 to 7) fields. The UE activates an SRI with SRI ID #i when a certain Si field indicates 1. The UE deactivates the SRI with SRI ID #i when the certain Si field indicates 0.

After 3 ms from transmitting a positive acknowledgment (ACK) to a MAC CE to activate certain PUCCH spatial relation information, the UE may activate the PUCCH relation information specified by the MAC CE.

<Spatial Relation for SRS and PUSCH>

The UE may receive information (SRS configuration information, for example, a parameter in an RRC control element "SRS-Config") used for transmission of a reference signal for measurement (e.g., a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a certain number of SRS resources (a certain number of SRS resources may be grouped together). Each SRS resource may be identified by an SRS resource identifier (SRS Resource Indicator (SRI)) or an SRS resource ID (Identifier).

The SRS resource set information may include an SRS resource set ID (SRS-ResourceSetId), a list of SRS resource IDs (SRS-ResourceId) used in the resource set, an SRS resource type, or information about SRS usage.

Here, the SRS resource type may indicate any one of a periodic SRS, a semi-persistent SRS, and an aperiodic SRS. Note that the UE may periodically (or after activation, periodically) transmit a P-SRS and SP-SRS, and may transmit an A-SRS on the basis of an SRS request from DCI.

The usage (an RRC parameter "usage" or an L1 (Layer-1) parameter "SRS-SetUse") may be, for example, beam management, codebook (CB), non-codebook (NCB), antenna switching, or the like. An SRS for the codebook or non-codebook usage may be used for determination of a precoder for codebook-based or non-codebook-based PUSCH transmission based on the SRI.

For example, in a case of codebook-based transmission, the UE may determine the precoder for the PUSCH transmission on the basis of the SRI, a transmitted rank indicator (TRI), and a transmitted precoding matrix indicator (TPMI). In a case of non-codebook-based transmission, the UE may determine the precoder for the PUSCH transmission on the basis of the SRI.

SRS spatial relation information (e.g., an RRC information element "spatialRelationInfo") may indicate information about a spatial relation between a certain reference signal and an SRS. The certain reference signal may be at least one of a synchronization signal/broadcast channel (Synchronization Signal/Physical Broadcast Channel (SS/PBCH)) block, a channel state information reference signal (CSI-RS), and an SRS (e.g., another SRS). The SS/PBCH block may be referred to as a synchronization signal block (SSB).

The SRS spatial relation information may include, as an index for the above-described certain reference signal, at least one of an SSB index, a CSI-RS resource ID, and an SRS resource ID.

Note that in the present disclosure, an SSB index, an SSB resource ID, and an SSBRI (SSB Resource Indicator) may be interchangeably interpreted. A CSI-RS index, a CSI-RS resource ID, and a CRI (CSI-RS Resource Indicator) may also be interchangeably interpreted. An SRS index, an SRS resource ID, and an SRI may also be interchangeably interpreted.

The SRS spatial relation information may include a serving cell index, a BWP index (BWP ID), or the like corresponding to the above-described certain reference signal.

In NR, uplink signal transmission may be controlled on the basis of the presence or absence of beam correspondence (BC). The BC may be, for example, a capability of a certain node (e.g., the base station or UE) to determine a beam used for signal transmission (transmit beam or Tx beam) on the basis of a beam used for signal reception (receive beam or Rx beam) (FIG. 1).

Note that the BC may be referred to as transmit/receive beam correspondence (Tx/Rx beam correspondence), beam reciprocity, beam calibration, calibrated/non-calibrated, reciprocity calibrated/non-calibrated, a degree of correspondence, a matching degree, and so on.

When spatial relation information related to an SSB or CSI-RS and an SRS is configured with respect to a certain SRS resource (e.g., when the BC is present), the UE may transmit the SRS resource by using the same spatial domain filter (spatial domain transmission filter) as a spatial domain filter (spatial domain reception filter) for reception of the SSB or CSI-RS. In this case, the UE may assume that a UE receive beam for the SSB or CSI-RS and a UE transmit beam for the SRS are the same.

With respect to a certain SRS (target SRS) resource, when spatial relation information related to another SRS (reference SRS) and the SRS (target SRS) is configured (e.g., when the BC is absent), the UE may transmit the target SRS resource by using the same spatial domain filter (spatial domain transmission filter) as a spatial domain filter (spatial domain transmission filter) for transmission of the reference SRS. In other words, in this case, the UE may assume that a UE transmit beam for the reference SRS and a UE transmit beam for the target SRS are the same.

The UE may determine, on the basis of a value of a certain field (e.g., an SRS resource identifier (SRI) field) in DCI (e.g., DCI format 0_1), a spatial relation of a PUSCH scheduled by the DCI. Specifically, the UE may use, for PUSCH transmission, spatial relation information (e.g., an RRC information element "spatialRelationInfo") about an SRS resource determined on the basis of the value of the certain field (e.g., the SRI).

When codebook-based transmission is used for the PUSCH, two SRS resources may be configured for the UE by RRC, and one of the two SRS resources may be indicated for the UE by DCI (1-bit certain field). When non-codebook-based transmission is used for the PUSCH, four SRS resources may be configured for the UE by the RRC, and one of the four SRS resources may be indicated for the UE by DCI (2-bit certain field). RRC reconfiguration is necessary for using a spatial relation other than the two or four spatial relations configured by the RRC.

Note that a DL-RS is configurable for spatial relations of SRS resources used for the PUSCH. For example, spatial relations of a plurality (e.g., at most 16 pieces) of SRS resources with respect to SP-SRSs are configured for the UE by RRC, and one of the plurality of the SRS resources can be indicated by a MAC CE.

<UL TCI State>

For Rel. 16 NR, using a UL TCI state as a method for indicating a UL beam is under study. Notification of the UL TCI state is similar to notification of a UE DL beam (DL TCI state). Note that the DL TCI state and a TCI state for a PDCCH/PDSCH may be interchangeably interpreted.

A channel/signal (which may be referred to as a target channel/RS) for which the UL TCI state is configured (specified) may be, for example, at least one of a PUSCH (DMRS for a PUSCH), a PUCCH (DMRS for a PUCCH), a random access channel (Physical Random Access Channel (PRACH)), an SRS, and the like.

For example, an RS (source RS) being in a QCL relation with the channel/signal may be a DL RS (e.g., an SSB, a CSI-RS, a TRS, or the like), or may be a UL RS (e.g., an SRS, an SRS for beam management, or the like).

The RS being in a QCL relation with the channel/signal in the UL TCI state may be associated with a panel ID for reception or transmission of the RS. The association may be explicitly configured (or specified) by higher layer signaling (e.g., RRC signaling, a MAC CE, or the like), or may be implicitly judged.

Correspondence between the RS and the panel ID may be configured by being included in UL TCI state information, or may be configured by being included in at least one of resource configuration information, spatial relation information, and the like about the RS.

QCL types indicated by the UL TCI state may be existing QCL types A to D, may be other QCL types, or may include certain spatial relations, related antenna ports (port indices), or the like.

When a related panel ID is specified (e.g., specified by DCI) with respect to UL transmission, the UE may perform the UL transmission by using a panel corresponding to the panel ID. The panel ID may be associated with the UL TCI state, and when the UL TCI state is specified (or activated) with respect to a certain UL channel/signal, the UE may identify, in accordance with a panel ID related to the UL TCI state, a panel used for transmission of the UL channel/signal.

(Method for Determining Spatial Relation)

As mentioned above, a plurality of TCI states for the PDCCH or PDSCH may be configured for the UE by RRC, and one of the plurality of the TCI states may be indicated by a MAC CE or DCI. Accordingly, beams can be promptly switched without RRC reconfiguration.

A maximum number of TCI states capable of being configured by the RRC (maxNrofTCI-States) is 128, and a maximum number of TCI states for the PDCCH (maxNrofTCI-StatesPDCCH) is 64.

With respect to the PUCCH, eight spatial relations for one PUCCH resource may be configured for the UE by the RRC, and one spatial relation may be indicated by the MAC CE. RRC reconfiguration is necessary for using a spatial relation other than the eight spatial relations configured by the RRC.

When codebook-based transmission is used for the PUSCH, two SRS resources may be configured for the UE by the RRC, and one of the two SRS resources may be indicated for the UE by DCI (1-bit field). When non-codebook-based transmission is used for the PUSCH, four SRS resources may be configured for the UE by the RRC, and one of the four SRS resources may be indicated for the UE by DCI (2-bit field). RRC reconfiguration is necessary for using a spatial relation other than the two or four spatial relations configured by the RRC.

A DL-RS is configurable for spatial relations of SRS resources used for the PUSCH. Spatial relations of a plurality (e.g., at most 16 pieces) of SRS resources for SP-SRSs are configured for the UE by RRC, and one of the plurality of the SRS resources can be indicated by the MAC CE. Spatial relations of SRS resources cannot be indicated by the MAC CE for the UE with respect to A-SRSs and P-SRSs.

Thus, as spatial relations for UL transmission (a PUCCH, PUSCH, or SRS), there is a possibility that configuring many spatial relation candidates at once is necessary. For example, when a DL-RS (DL TCI state) as the spatial relations for the UL transmission is used depending on beam correspondence, there is a possibility that many DL-RSs (e.g., 32 pieces of SSBs) are configured.

However, as mentioned above, the number of spatial relation candidates capable of being configured for the UL transmission at once is limited, and is less than the number of TCI state candidates capable of being configured for DL transmission at once. It is conceivable that another spatial relation is configured by RRC reconfiguration in order to use spatial relations not configured for the UL transmission. Performing the RRC reconfiguration may cause an occurrence of unavailable time for communication, consumption of resources, and the like, and system performance may deteriorate.

Therefore, in FR 2, when spatial relations (spatial relation information) are not configured for dedicated configuration of PUCCHs or SRSs except SRSs with beam management as usage (usage='BeamManagement'), a default spatial relation for the dedicated configuration of the PUCCHs or SRSs may be applied.

However, the default spatial relation is indefinite. Unless an appropriate spatial relation is used, deterioration of system performance, such as reduction in communication quality, reduction in throughput, or the like, may occur.

Thus, the inventors of the present invention came up with the idea of a default spatial relation determination method for the UE.

Hereinafter, embodiments according to the present disclosure will be described in detail with reference to the drawings. The radio communication methods according to respective embodiments may each be employed individually, or may be employed in combination.

In the present disclosure, a spatial relation, spatial relation information, a spatial relation assumption, a spatial domain transmission filter, a UE spatial domain transmission filter, a spatial domain filter, a UE transmit beam, a UL transmit beam, an RS for a spatial relation, a DL-RS, a QCL assumption, an SRI, a spatial relation based on an SRI, and a UL TCI may be interchangeably interpreted.

A TCI state, a TCI state or QCL assumption, a QCL assumption, a spatial domain reception filter, a UE spatial domain reception filter, a spatial domain filter, a UE receive beam, a DL receive beam, and a DL-RS may be interchangeably interpreted. An RS of QCL type D, a DL-RS associated with QCL type D, a DL-RS with QCL type D, a DL-RS source, an SSB, and a CSI-RS may be interchangeably interpreted.

In the present disclosure, the TCI state may be information related to a receive beam (spatial domain reception filter) indicated (configured) for the UE (e.g., a DL-RS, a QCL type, and a cell in which a DL-RS is transmitted). The QCL assumption may be information related to a receive beam (spatial domain reception filter) assumed by the UE on the basis of transmission or reception of an associated signal (e.g., a PRACH) (e.g., a DL-RS, a QCL type, and a cell in which a DL-RS is transmitted).

In the present disclosure, a PCell, a primary secondary cell (PSCell), and a special cell (SpCell) may be interchangeably interpreted.

In the present disclosure, DCI format 0_0 may be interpreted as DCI not including an SRI, DCI not including spatial relation indication, or DCI not including a CIF. In the present disclosure, DCI format 0_1 may be interpreted as DCI including an SRI, DCI including spatial relation indication, or DCI including a CIF.

In the present disclosure, specific UL transmission, a specific type of UL transmission, and at least one of a PUSCH, a PUCCH, and an SRS may be interchangeably interpreted.

In the present disclosure, a cell, a CC, a carrier, a BWP, a band, and the like may be interchangeably interpreted.

In the present disclosure, an index, an ID, an indicator, and a resource ID may be interchangeably interpreted.

(Radio Communication Method)

The UE may perform specific UL transmission in accordance with the default spatial relation under certain conditions.

In the present disclosure, "the UE transmits the specific UL transmission in accordance with the default spatial relation," "the UE uses the default spatial relation for a spatial relation for the specific UL transmission," "the UE assumes (regards) that the spatial relation for the specific UL transmission is identical to that of an RS for the default spatial relation," and "the UE assumes (regards) that the spatial relation for the specific UL transmission is identical to that of the RS of QCL type D for the default spatial relation" may be interchangeably interpreted.

<<Default Spatial Relation>>

In the present disclosure, the default spatial relation, a default spatial relation assumption, a TCI state or a QCL assumption for specific DL transmission, an RS related to a QCL parameter given by the TCI state or the QCL assumption for the specific DL transmission, the RS of QCL type D in the TCI state or the QCL assumption for the specific DL transmission, a spatial relation for reference UL transmission, a specific RS, a specific DL RS, and a first reference signal may be interchangeably interpreted.

The specific DL transmission, a specific type of DL transmission, a specific DL channel, and at least one of a PDCCH and a PDSCH may be interchangeably interpreted.

The reference UL transmission may be UL transmission satisfying a certain condition, may be the latest PUSCH transmission, may be the latest PUCCH transmission, may be the latest PRACH transmission, may be the latest SRS transmission, may be the latest UL transmission, or may be the latest transmission of at least one of the PUSCH, PUCCH, PRACH, and SRS.

As an RS for the spatial relation for the specific UL transmission for determination of a UL transmit beam (spatial domain transmission filter), using the RS of QCL type D in the TCI state or the QCL assumption for the specific DL transmission for determination of a UE receive beam (spatial domain reception filter) is preferable. Particularly, when the TCI state or the QCL assumption for the specific DL transmission includes both an RS of QCL type A and the RS of QCL type D, and the RS of QCL type A and the RS of QCL type D are different from each other, using the RS of QCL type D in the TCI state or the QCL assumption for the specific DL transmission as the RS for the spatial relation for the specific UL transmission is preferable.

For example, as mentioned above, when a TCI state indicates the RS of QCL type A being a TRS for a serving cell (e.g., an SCell) for which the TCI state is configured and the RS of QCL type D being a CSI-RS for another serving cell (e.g., a PCell) in which repetition is configured, the RS of QCL type A and the RS of QCL type D are different from each other. It is conceivable that parameters of QCL type A differ depending on cells, and thus it is preferable that the RS of QCL type A is transmitted in a cell for which the TCI state is configured. On the other hand, the RS of QCL type D may be transmitted in a serving cell other than the cell for which the TCI state is configured. Note that a serving cell for which the TCI state is configured may be a PCell, and the serving cell in which the RS of QCL type D is transmitted may be an SCell.

The default spatial relation may be the TCI state for the specific DL transmission, or may be the QCL assumption for the specific DL transmission. This TCI state or QCL assumption may be explicitly configured (activated or indicated) for the UE by at least one of RRC signaling, a MAC CE, and DCI, or may be determined by the UE on the basis of measurement of the SSB or CSI-RS. This TCI state or QCL assumption may be an RS used for the reference UL transmission.

The default spatial relation may be interpreted as an active TCI state (activated TCI state), an active TCI state or QCL assumption, a default TCI state, a default QCL assumption, and so on.

A plurality of TCI states may be active for the specific DL transmission. In this case, the default spatial relation may be a default TCI state (default RS or default TCI state or QCL assumption).

The default TCI state may be interpreted as a TCI state, an active TCI state, or a QCL assumption for a specific CORESET, may be interpreted as a TCI state for a CORESET having the lowest CORESET-ID in the latest slot, may be interpreted as an RS for a CORESET having the lowest CORESET-ID in the latest slot in which one or more CORESETs in an active BWP for a serving cell are monitored by the UE, the CORESET being associated with a search space to be monitored, and the RS being related to a QCL parameter used for QCL indication for a PDCCH, may be interpreted as a TCI state or a QCL assumption for a CORESET having the lowest CORESET-ID in the latest slot and associated with a search space to be monitored, may be interpreted as a TCI state or a QCL assumption for a CORESET having the lowest CORESET-ID in a specific slot and associated with a search space to be monitored, may be interpreted as a TCI state or a QCL assumption for a specific CORESET, may be interpreted as a TCI state or a QCL assumption for DL transmission corresponding to specific UL transmission (alternatively, a DL channel to trigger the specific UL transmission, a DL channel to schedule the specific UL transmission, or a DL channel to schedule a DL channel corresponding to the specific UL transmission) (e.g., an RS of QCL type D in the TCI state or the QCL assumption), or may be interpreted as an RS related to a QCL parameter for specific DL transmission (RS being QCL with the specific DL transmission (e.g., an RS of QCL type D)).

The specific slot may be the latest slot in PDSCH reception, or may be the latest slot in the specific UL transmission.

The specific CORESET may be a CORESET with a CORESET ID specified by higher layer signaling (e.g., spatial relation information about the specific UL transmission), or may be CORESET 0. The specific CORESET may include CORESET 0, or may not include CORESET 0.

The default spatial relation may be an RS (RS resource index, SSB index, or CSI-RS resource index) corresponding to PRACH resources used for the latest PRACH transmission or PRACH occasions. The default spatial relation may be a spatial relation for Msg. 3 (PUSCH scheduled by a UL grant (RAR UL grant) included in random access response (RAR)).

The default spatial relation may be a spatial relation corresponding to a specific PUCCH resource. When the specific UL transmission is a PUSCH in a certain cell, the specific DL transmission may be a PUCCH resource with the lowest ID in an active UL BWP for the cell, or may be a PUCCH resource group with the lowest ID in the active UL BWP for the cell.

When the specific UL transmission is a PUCCH, the specific DL transmission may be a PDCCH corresponding to the PUCCH (PDCCH to schedule a PDSCH corresponding to HARQ-ACK delivered by the PUCCH), or may be a PDSCH corresponding to HARQ-ACK delivered by the PUCCH. When the specific UL transmission is a PUSCH, the specific DL transmission may be a PDCCH to schedule the PUSCH, may be a PDCCH to schedule a PDSCH corresponding to HARQ-ACK delivered by the PUSCH, or may be a PDSCH corresponding to HARQ-ACK delivered by the PUSCH. When the specific UL transmission is an A-SRS, the specific DL transmission may be a PDCCH to trigger the A-SRS. When the specific UL transmission is UL transmission triggered by a MAC CE, such as an SP-SRS, the specific DL transmission may be a PDCCH to schedule the MAC CE, or may be a PDSCH to deliver the MAC CE.

For example, when the specific UL transmission is a PUCCH (or PUSCH) to deliver HARQ-ACK, the specific DL transmission may be a PDCCH to indicate the PUCCH resource (PDCCH to schedule a PDSCH corresponding to the HARQ-ACK), or may be a PDSCH (used for generation of the HARQ-ACK) corresponding to the HARQ-ACK.

The UE may determine the default spatial relation used for a certain slot.

The specific DL transmission may be the latest PDSCH.

The specific DL transmission may be configured for the UE by higher layer signaling, or may be defined by specifications.

The specific DL transmission may be a DL RS for path loss measurement (e.g., pathlossReferenceRS in SRS-ResourceSet in SRS-Config, PUCCH-PathlossReferenceRS in PUCCH-PowerControl in PUCCH-Config, or PUSCH-PathlossReferenceRS in PUSCH-PowerControl in PUSCH-Config). The DL RS for path loss measurement may be a CSI-RS, or may be an SSB. The path loss reference RS may depend on an active TCI state.

When the DL RS for path loss measurement is configured by higher layer signaling, the UE may use the configured DL RS for path loss measurement as the default spatial relation. When the DL RS for path loss measurement is not configured by the higher layer signaling, the UE may determine an ID (RS resource index qd) of the DL RS for path loss measurement for PUSCH transmission, and may use the determined DL RS for path loss measurement as the default spatial relation.

When the default spatial relation is a TCI state or a QCL assumption, there is a case where a DL RS for the spatial relation for the specific UL transmission and a DL RS for path loss measurement for power control in the specific UL transmission are different from each other. Commonality of the DL RS for the spatial relation for the specific UL transmission and the DL RS for path loss measurement for the power control in the specific UL transmission enables the power control in the specific UL transmission to be appropriately performed.

The default spatial relation may be an updated DL TCI state. This default spatial relation may be used for the UE having a capability to use one active beam.

The default spatial relation may be a TCI state for a PDCCH to trigger or schedule an A-SRS or a PUCCH.

The default spatial relation may be configured, indicated, or specified by at least one of RRC, a MAC CE, and DCI. This specific spatial relation may be referred to as a reference spatial relation, a spatial relation configuration, and so on.

In the present disclosure, the reference spatial relation may be configured, similarly to Rel. 15, as any one of an SSB, a CSI-RS resource, and an SRS resource. The reference spatial relation may be an ID for identification of the TCI state. This ID may be an ID associated with at least one of a CORESET, a PDSCH, and a CSI-RS resource. The reference spatial relation may be a UL TCI state.

The default spatial relation may be a spatial relation corresponding to a dedicated PUCCH resource with the lowest ID in an active UL BWP for a cell for the specific UL transmission.

<<Condition for Use of Default Spatial Relation>>

When a certain condition is satisfied, the UE may transmit the PUSCH in accordance with the default spatial relation.

The condition may include at least one of the following conditions.

The condition may be a case where use of the default spatial relation for the spatial relation for the specific UL transmission is implicitly or explicitly configured. A case where use of the default spatial relation for the spatial relation for the specific UL transmission is implicitly configured for the UE may be, for example, a case where a spatial relation for the specific UL transmission (e.g., spatialRelationInfo or PUCCH-SpatialRelationInfo) is not configured for the UE. A case where use of the default spatial relation for the spatial relation for the specific UL transmission is explicitly configured for the UE may be a case where a specific parameter is configured by a specific higher layer parameter.

In frequency range 1 (FR 1 or frequency being 6 GHz or less), the UE may not use analog beam forming for UL transmission, and spatial relations may not be configured for UL transmission.

The condition may be the case that the PUSCH is transmitted in frequency range 2 (FR 2 or frequency being 6 GHz or more (or frequency higher than 24 GHz)).

The condition may be the case that the RS of QCL type D in the TCI state for the specific DL transmission is applicable.

The condition may be the case that the RS of QCL type D in the TCI state for the specific DL transmission is applicable in FR 2.

The condition may be the case that a certain function of Rel. 16 (or later versions) is configured.

The certain function may be a beam-related function of Rel. 16 (or later versions). The certain function may be configured for the UE by higher layer signaling. The beam-related function may be at least one of low latency beam selection, Layer 1 (L1)-Signal to Interference plus Noise Ratio (SINR) beam reporting (L1-SINR beam reporting), and BFR on a secondary cell (SCell) (BFR on SCell). The low latency beam selection may be referred to as fast beam selection, beam selection without TCI states (beam selection w/o TCI state), beam selection type II, TCI state specification type 2, and so on. The L1-SINR beam reporting may be the case that the UE reports an L1-SINR measurement result (L1-SINR corresponding to CSI or beam) for beam management. The BFR on SCell may be at least one of detection of beam failure (BF) in the SCell, transmission of a beam failure recovery request (BFRQ) to the SCell, and reception of a beam failure recovery (BFR) response from the SCell.

The condition may be the case that the UE has reported specific UE capability information. The specific UE capability information may indicate that a specific spatial relation is supported, or may indicate that the above-mentioned certain function is supported. The specific UE capability information may be a parameter indicating that the default spatial relation is supported, or may be a parameter having a name indicating any one of the default spatial relation or default spatial relation information (default spatial relation info).

The condition may be the case that the specific UE capability information is reported and use of the specific spatial relation is implicitly or explicitly configured.

The UE supporting the specific spatial relation may report the specific UE capability information indicating that the specific spatial relation is supported.

The UE supporting the specific spatial relation may report UE capability information indicating a channel type to support the specific spatial relation. The channel type may be at least one of a PUCCH, an SRS, and a PUSCH.

The UE supporting the specific spatial relation may report UE capability information indicating a QCL source type to support the specific spatial relation. The QCL source type may be at least one of a CORESET, a PDCCH, and a PDSCH.

The UE not supporting the specific spatial relation (e.g., the UE that has not reported that the specific spatial relation is supported or the UE that has reported that the specific spatial relation is not supported) may use a spatial relation corresponding to the specific PUCCH resource in place of the default spatial relation.

Reporting the specific UE capability information can reduce overhead in notification (at least one of configuration and activation) related to spatial relation information.

The condition may be the case that use of the default spatial relation is implicitly or explicitly configured.

The condition may be the case that spatial relations (spatial relation information) are not configured for a dedicated configuration for UL transmission. The dedicated configuration may be a dedicated configuration for at least one of a PUCCH and an SRS. The dedicated configuration may be an SRS using an SRS resource set (or SRS resources in the SRS resource set) not being beam management (beamManagement) as usage (being codebook transmission (codebook), non-codebook transmission (nonCodebook), or antenna switching (antennaSwitching)).

If the UE uses the default spatial relation for a spatial relation for the SRS when usage of the SRS resource set is beam management, the same beam (default spatial relation) will be used in all SRS symbols, and thus an SRS beam cannot be swept. The UE uses the default spatial relation for the spatial relation for the SRS only when the usage of the SRS resource set is not beam management, and thus the beam can be swept when the usage of the SRS resource set is beam management.

The condition may be the case that time offset between reception of DCI (e.g., DCI to schedule the specific DL transmission) and reception of the specific DL transmission is equal to or greater than a threshold value when use of the default spatial relation for the spatial relation for the specific UL transmission is implicitly or explicitly configured for the UE. The default spatial relation may be a TCI state or a QCL assumption applied to a CORESET used for PDCCH transmission to schedule the specific DL transmission (e.g., an RS of QCL type D in the TCI state or the QCL assumption).

The condition may be the case that time offset between reception of DCI (e.g., DCI to schedule the specific DL transmission) and reception of the specific DL transmission is less than a threshold value when use of the default spatial relation for the spatial relation for the specific UL transmission is implicitly or explicitly configured for the UE or when a specific parameter is configured for the UE by a specific higher layer parameter.

The condition may be the case that when TCI presence information (e.g., a higher layer parameter TCI-PresentIn-DCI) is not configured for a CORESET to schedule a PDSCH or when the PDSCH is scheduled by DCI format 1_0, time offset between reception of DL DCI (e.g., DCI to schedule the PDSCH) and reception of a PDSCH corresponding to the DCI is equal to or greater than a threshold value. The default spatial relation for a PUCCH (or PUSCH) to deliver HARQ-ACK for the PDSCH may be a TCI state or a QCL assumption applied to a CORESET used for PDCCH transmission to schedule the PDSCH (e.g., an RS of QCL type D in the TCI state or the QCL assumption).

When the TCI presence information is set to "enabled," the condition may be a case where a TCI field in DCI in a component carrier (CC) to schedule (a PDSCH) indicates an activated TCI state in a CC or DL BWP to be scheduled and the PDSCH is scheduled by DCI format 1_1. The default spatial relation for the PUCCH (or PUSCH) to deliver HARQ-ACK for the PDSCH may be a TCI according to a TCI field value in a detected PDCCH including the DCI. The condition may be a case where time offset between reception of DL DCI (to schedule the PDSCH) and a PDSCH corresponding to the DCI is equal to or greater than a threshold value. The default spatial relation for the PUCCH (or PUSCH) to deliver HARQ-ACK for the PDSCH may be an RS in a TCI state related to a QCL parameter given by an indicated TCI state (e.g., an RS of QCL type D) (e.g., FIG. 2A).

The condition may be a case where time offset between reception of DL DCI (DCI to schedule the PDSCH) and a corresponding PDSCH (PDSCH scheduled by the DCI) is less than a threshold value in both a case where TCI presence information is set to "enabled" in an RRC connected mode and a case where TCI information in the DCI is not configured in the RRC connected mode. The default spatial relation for the PUCCH (or PUSCH) to deliver HARQ-ACK for the PDSCH may be an RS for a CORESET having the lowest CORESET-ID in a specific slot (e.g., the latest slot) in which one or more CORESETs in an active BWP for the serving cell are monitored by the UE, the CORESET being associated with a search space to be monitored, and the RS being related to a QCL parameter used for QCL indication for the PDCCH (e.g., FIG. 2B). The default spatial relation for the PUCCH (or PUSCH) to deliver HARQ-ACK for the PDSCH may be an RS related to a QCL parameter for the PDSCH (RS being QCL with the PDSCH (DM-RS port for the PDSCH or antenna port for the PDSCH) (e.g., an RS of QCL type D)).

The specific slot may be the latest slot in a PDSCH corresponding to the specific UL transmission (e.g., a PDSCH corresponding to HARQ-ACK delivered by the specific UL transmission). In this case, the UE uses the RS related to the QCL parameter associated with the CORESET in the latest slot for the PDSCH for the spatial relation for the specific UL transmission, and thus a beam for the PDSCH (spatial domain reception filter) and a beam for the specific UL transmission (spatial domain transmission filter) can be identical to each other, thereby avoiding beam change processing, and thus processing load can be suppressed.

The specific slot may be the latest slot in the specific UL transmission. In this case, the UE uses the RS related to the QCL parameter associated with the CORESET in the latest slot for the specific UL transmission for the spatial relation for the specific UL transmission, and thus a beam for the latest PDCCH (spatial domain reception filter) and a beam for the specific UL transmission (spatial domain transmission filter) can be identical to each other, thereby avoiding beam change processing, and thus processing load can be suppressed.

The condition may be a case where SRS resources for which an RS for spatial relation information is configured are not indicated by DCI to schedule a PUSCH. The default spatial relation may be a default spatial relation in a slot for transmission of the PUSCH.

The condition may be a case where an SRI field in DCI format 0_1 to schedule the PUSCH indicates SRS resources for which the RS for the spatial relation information is not configured. The default spatial relation may be a TCI state, a QCL assumption, or an RS for the specific DL transmission. The DL transmission may be a PDCCH, may be a PDSCH, or may be an A-CSI-RS.

The condition may be a result obtained by comparing time offset related to the specific UL transmission with a threshold value. The time offset may be time between a timing related to the specific UL transmission and the specific UL transmission. The threshold value may be referred to as a time length for QCL (timeDurationForQCL), a time offset threshold value, Threshold for offset between a DCI indicating a TCI state and a PDSCH scheduled by the DCI, a scheduling offset threshold value (Threshold-Sched-Offset), and so on. The time offset may be time between reception of DCI (PDCCH) related to the specific UL transmission and the specific UL transmission. The time offset may be time between a MAC CE for activation of the spatial relation information (activation MAC CE or activation/deactivation MAC CE) and the specific UL transmission. The time offset may be time between an update on TCI states used for the default spatial relation and the specific UL transmission.

<Embodiment 1>

The latest slot in the above-mentioned default spatial relation (default TCI state) may be any one of the following.

<<Latest Slot 1>>

The latest slot may be the latest slot for a start symbol for the specific UL transmission (or before the symbol).

The same transmit beam as a transmit beam just before the specific UL transmission can be used, and thus an occurrence of beam switching can be suppressed.

<<Latest Slot 2>>

The latest slot may be the latest slot for the first or last symbol for DL transmission corresponding to the specific UL transmission (before the symbol). For example, when the specific UL transmission is a PUCCH, the DL transmission corresponding to the specific UL transmission may be a PDSCH corresponding to the PUCCH (PDSCH corresponding to HARQ-ACK delivered on the PUCCH).

A beam actually used in reception of the DL transmission corresponding to the specific UL transmission is used for the specific UL transmission, thereby allowing beam correspondence to be appropriately performed.

<Embodiment 2>

Only one TCI state may be activated for the specific DL transmission (only one active TCI state may be configured, indicated, or specified for the specific DL transmission). The specific DL transmission may be a PDCCH, or may be a PDSCH. If only one TCI state is activated for the UE for the specific DL transmission, the UE may use a default spatial relation for specific UL transmission.

<<Case 1 Where Only One TCI State is Activated>>

If only one TCI state is activated for the specific DL transmission, the default spatial relation may be the one active TCI state (the UE may use the active TCI state as the default spatial relation).

<<Case 2 Where Only One TCI State is Activated>>

If only one TCI state is activated for the specific DL transmission, the default spatial relation may be a path loss reference RS (when a plurality of path loss reference RSs exist, one of those) (the UE may use the path loss reference RS as the default spatial relation).

If a plurality of active TCI states are configured, and the default spatial relation is based on any one of the plurality of the active TCI states, there is a possibility that the default spatial relation is changed frequently, and there is a possibility that the default spatial relation does not become the best spatial relation. Only one TCI state is activated, thereby allowing frequency of changing the default spatial relation to be suppressed.

<Embodiment 3>

The condition may be the case that the specific UL transmission is transmitted to one TRP (single TRP or S-TRP).

In the present disclosure, the case that the specific UL transmission is transmitted to one TRP, the case that the S-TRP is configured for the specific UL transmission, the case that the number of CORESET groups is 1, the case that CORESET groups are not configured, the case that the number of PUCCH groups is 1, and the case that PUCCH groups are not configured may be interchangeably interpreted.

When a plurality of TRPs are used, a plurality of active TCI states are configured, and assuming that the default spatial relation is based on any one of the plurality of the active TCI states, there is a possibility that the default spatial relation is changed frequently, and there is a possibility that the default spatial relation does not become the best spatial relation. Only one TCI state is activated, thereby allowing frequency of changing the default spatial relation to be suppressed.

<Embodiment 4>

The condition may be the case that a CORESET is configured for a cell for the specific UL transmission. The default spatial relation may be a TCI state for the above-mentioned CORESET (e.g., a default TCI state).

When CORESETs are not configured for the cell for the specific UL transmission in carrier aggregation (CA), the UE can be prevented from using a TCI state for another cell as the default spatial relation for the cell. For example, the condition is effective in CA using different bands or frequency ranges (FRs), for example, inter-band CA and FR 1-FR 2 CA (CA using a cell for FR 1 and a cell for FR 2).

The UE may use the default spatial relation for specific UL transmission for a cell in intra-band CA. The default spatial relation may be a CORESET TCI state. Even when a CORESET is not configured for the cell for the specific UL transmission, the UE may use the default spatial relation for the specific UL transmission. When a CORESET is not configured for the cell for the specific UL transmission, the UE may use, as the default spatial relation for the specific UL transmission, the CORESET TCI state configured for another cell in intra-band CA.

<Embodiment 5>

The UE may use the default spatial relation for the specific UL transmission regardless of whether a CORESET is configured for the cell for the specific UL transmission.

A beam (TCI state or spatial domain reception filter) for a scheduling cell (cell in which a PDCCH to schedule the specific UL transmission is transmitted) in cross-carrier scheduling and a beam (spatial relation or spatial domain transmission filter) for a scheduled cell (cell in which the specific UL transmission is transmitted) may be the same.

The UE may use the default spatial relation for the specific UL transmission regardless of whether a CORESET is configured, for the specific UL transmission in a cell for intra-band CA, for the cell.

The UE may use the default spatial relation for the specific UL transmission regardless of whether a cell for the specific UL transmission is for intra-band CA or inter-band CA and whether a CORESET is configured for the cell.

<Embodiment 6>

The condition may be the case that the specific UL transmission is a PUSCH, a PUSCH in a certain cell is scheduled by DCI format 0_0, and PUCCH resources are not configured for the cell.

When a PUSCH in a certain cell is scheduled by DCI format 0_0, PUCCH resources are not configured for the cell, and a CORESET is configured for the cell, the UE may use an active TCI state for the CORESET for a spatial relation for the PUSCH (the default spatial relation may be the active TCI state for the CORESET).

A PUSCH in a cell in CA may be scheduled by DCI format 0_0, PUCCH resources may not be configured for the cell, and the UE may use, for a spatial relation for the PUSCH, an active TCI state for a CORESET in another cell in the CA (the default spatial relation may be the active TCI state for the CORESET in another cell in the CA).

A PUSCH in a cell in intra-band CA may be scheduled by DCI format 0_0, PUCCH resources may not be configured for the cell, and the UE may use, for a spatial relation for the PUSCH, an active TCI state for a CORESET in another cell in the CA (the default spatial relation may be the active TCI state for the CORESET in another cell in the CA).

When a plurality of TCI states for CORESETs exist in the default spatial relation, the default spatial relation may be the above-mentioned default TCI state.

According to this embodiment, a PUSCH can be scheduled by DCI format 0_0 for a cell for which PUCCH resources are not configured.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 3:
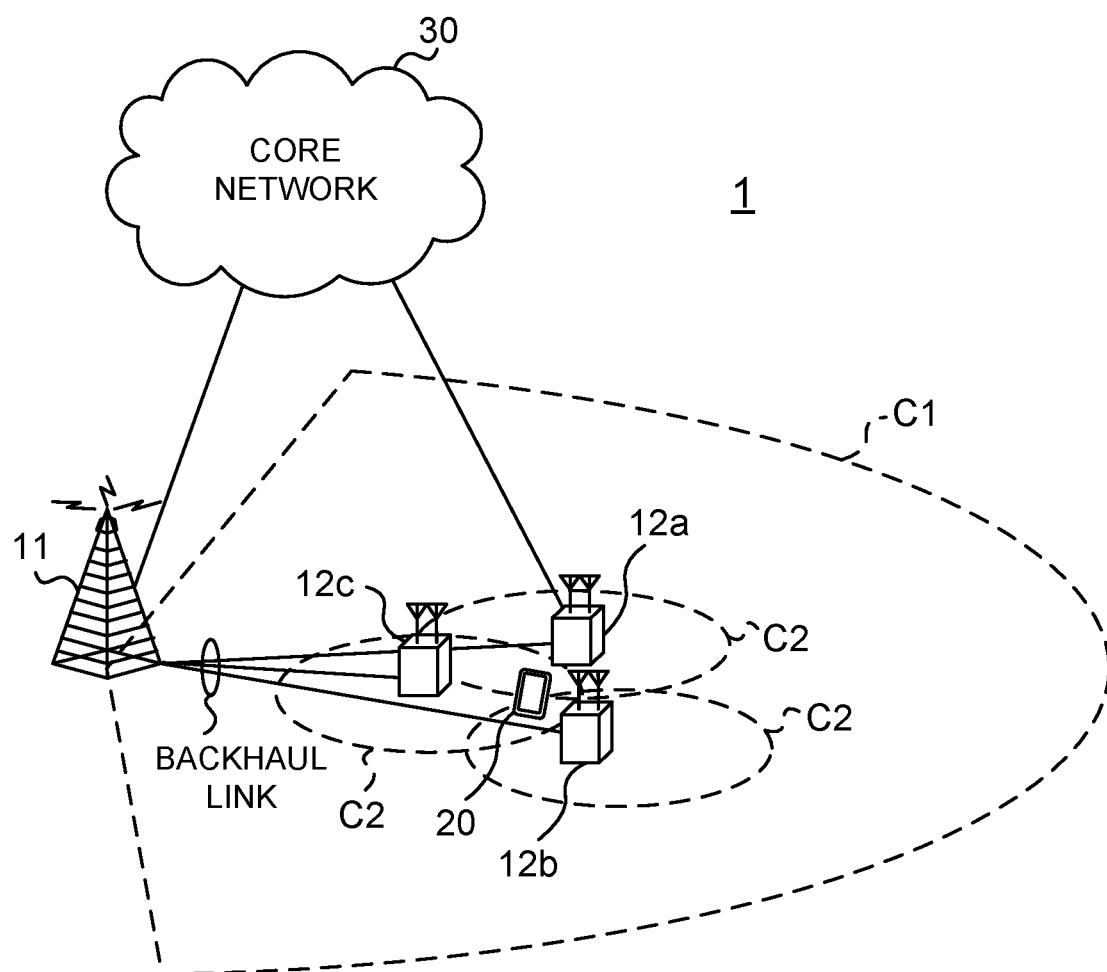
FIG. 3 is a diagram to show an example of a schematic structure of a radio communication system according to one embodiment.

FIG. 3 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 4:
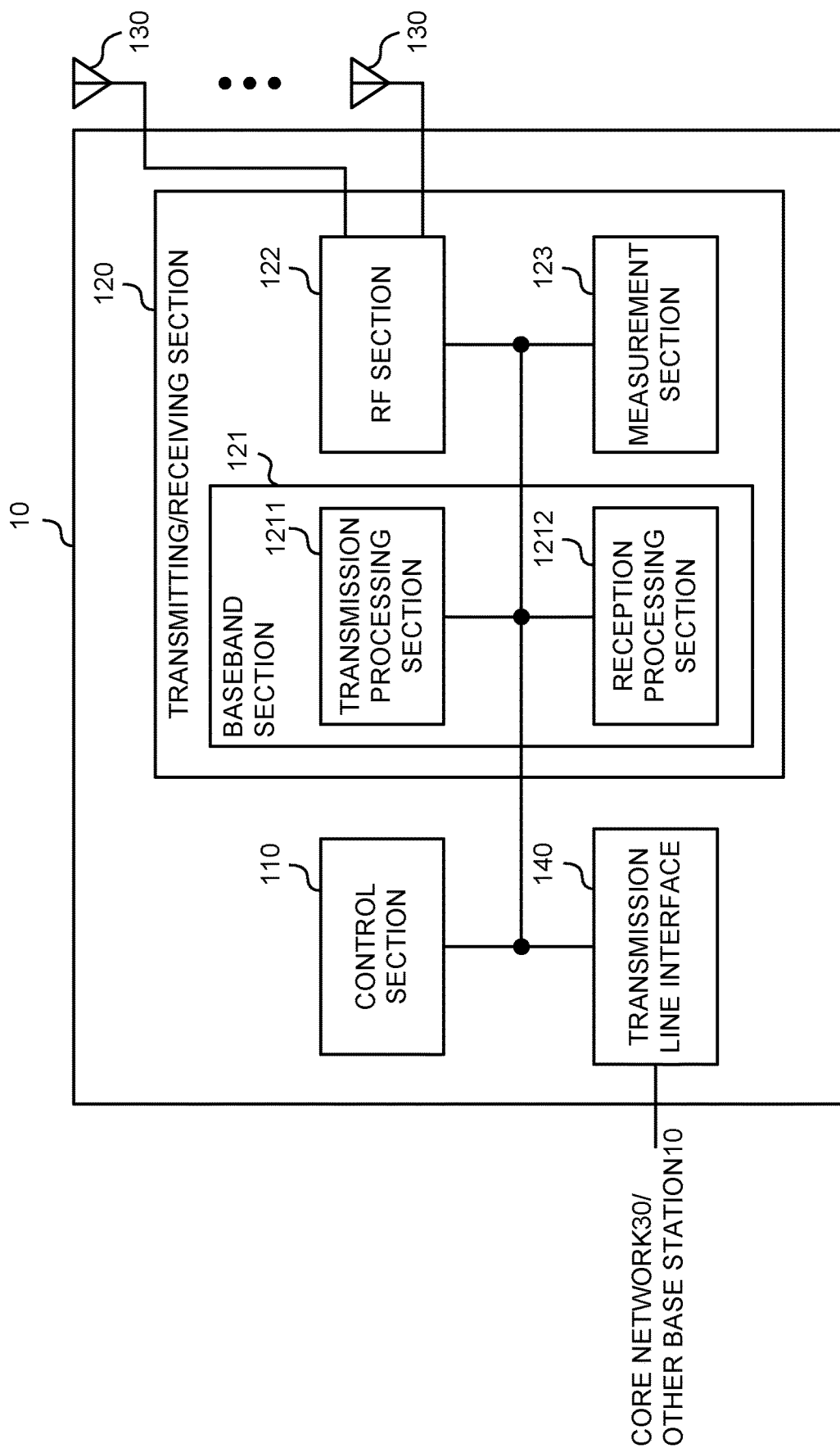
FIG. 4 is a diagram to show an example of a structure of a base station according to one embodiment.

FIG. 4 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a reference signal (e.g., an SSB, a CSI-RS, or the like). The transmitting/receiving section 120 may transmit information (MAC CE or DCI) to indicate a TCI state for specific DL transmission. The TCI state may indicate at least one of a reference signal (e.g., an SSB, a CSI-RS, or the like), a QCL type, and a cell for transmitting the reference signal. The TCI state may indicate one or more reference signals. The one or more reference signals may include a reference signal of QCL type A, or may include a reference signal of QCL type D.

The control section 110 may assume that a first reference signal for a spatial relation for specific uplink transmission (e.g., an SRS, a PUCCH, a PUSCH, or the like) is a second reference signal of QCL type D (e.g., an SSB or a CSI-RS) in a transmission configuration indication (TCI) state or a quasi-co-location (QCL) assumption for a specific downlink channel (e.g., a PDCCH, a PDSCH, or the like).

(User Terminal)

Figure 5:
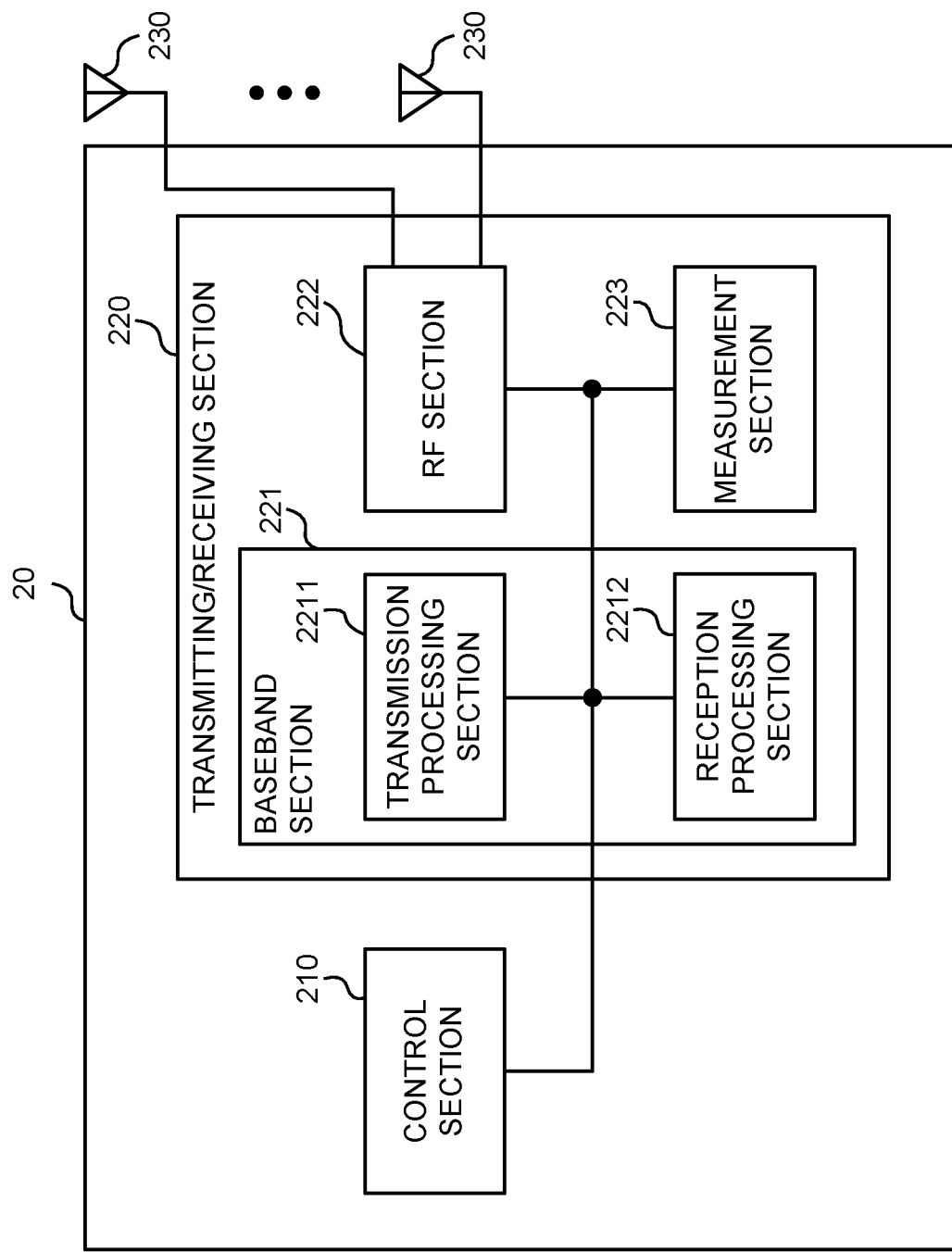
FIG. 5 is a diagram to show an example of a structure of a user terminal according to one embodiment.

FIG. 5 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

A control section 210 determines, when a spatial relation for specific UL transmission is not configured, one specific spatial relation between a quasi-co-location (QCL) parameter related to a latest slot for a start symbol for the specific UL transmission or a first or last symbol for DL transmission corresponding to the specific UL transmission (embodiment 1) and a transmission configuration indication (TCI) state or a reference signal for path loss reference in a case where only one transmission configuration indication (TCI) state is activated for the specific DL transmission (embodiment 2). The transmitting/receiving section 220 may perform the specific UL transmission in accordance with the specific spatial relation.

When the specific UL transmission is transmitted to one transmission/reception point (embodiment 3), when a control resource set (CORESET) is configured for a cell for the specific UL transmission (embodiment 4), when the specific UL transmission is transmitted in a cell in intra-band carrier aggregation (embodiments 4 and 5), or when the specific UL transmission is scheduled by DL control information format not including spatial relation indication and a physical DL control channel resource is not configured for the cell for the specific UL transmission (embodiment 6), the control section 210 may determine the specific spatial relation.

The specific spatial relation may be a TCI state related to a CORESET with the lowest CORESET ID in the slot (e.g., a default TCI state).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 6:
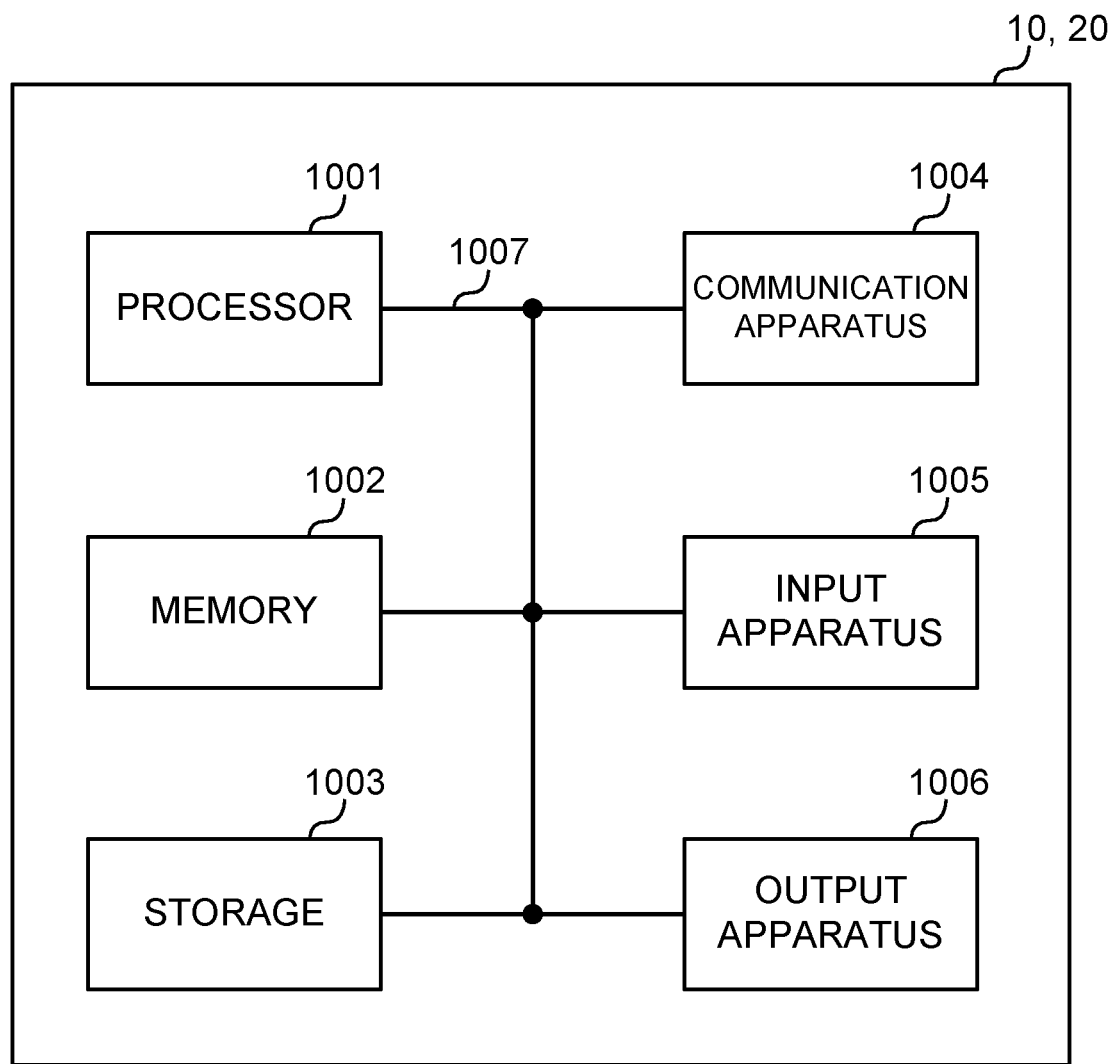
FIG. 6 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 6 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2019-158303 filed on Aug. 30, 2019. The entire contents of the application are herein incorporated.

What is claimed is:

1. A terminal comprising:
   a processor that, when a condition is met, determines a spatial relation of an uplink signal in a component carrier (CC), based on a quasi co-location (QCL) assumption of a specific control resource set in the CC; and
   a transmitter, coupled to the processor, that transmits the uplink signal according to the spatial relation,
   wherein the condition includes that a higher layer parameter for using a default spatial relation is configured, that spatial relation information for the uplink signal is not configured, and that a control resource set in the CC is configured.

2. The terminal according to claim 1, wherein the specific control resource set is a control resource set with a lowest control resource set ID.

3. The terminal according to claim 1, wherein the condition includes that a number of groups of control resource sets is 1.

4. A radio communication method for a terminal, the method comprising:
   when a condition is met, determining a spatial relation of an uplink signal in a component carrier (CC), based on a quasi co-location (QCL) assumption of a specific control resource set in the CC; and
   transmitting the uplink signal according to the spatial relation,
   wherein the condition includes that a higher layer parameter for using a default spatial relation is configured, that spatial relation information for the uplink signal is not configured, and that a control resource set in the CC is configured.

5. A base station comprising:
   a processor that, when a condition is met, determines a spatial relation of an uplink signal in a component carrier (CC), based on a quasi co-location (QCL) assumption of a specific control resource set in the CC; and
   a receiver, coupled to the processor, that receives the uplink signal transmitted according to the spatial relation,
   wherein the condition includes that a higher layer parameter for using a default spatial relation is configured, that spatial relation information for the uplink signal is not configured, and that a control resource set in the CC is configured.

6. A system comprising a terminal and a base station, wherein
   the terminal comprises:
      a processor of the terminal that, when a condition is met, determines a spatial relation of an uplink signal in a component carrier (CC), based on a quasi co-location (QCL) assumption of a specific control resource set in the CC; and
      a transmitter, coupled to the processor of the terminal, that transmits the uplink signal according to the spatial relation,
   the condition includes that a higher layer parameter for using a default spatial relation is configured, that spatial relation information for the uplink signal is not configured, and that a control resource set in the CC is configured, and
   the base station includes a receiver, coupled to a processor of the base station, that receives the uplink signal.

* * * * *